Feb. 25, 1964 R. M. WERNICKE 3,122,110
HAND TRANSPLANTER FOR TREE SEEDLINGS
Filed May 12, 1961 2 Sheets-Sheet 1
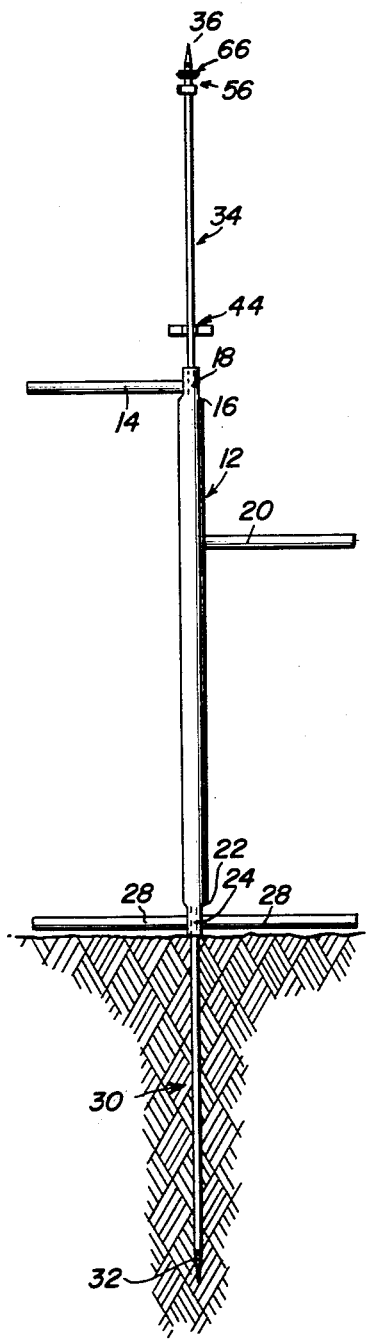
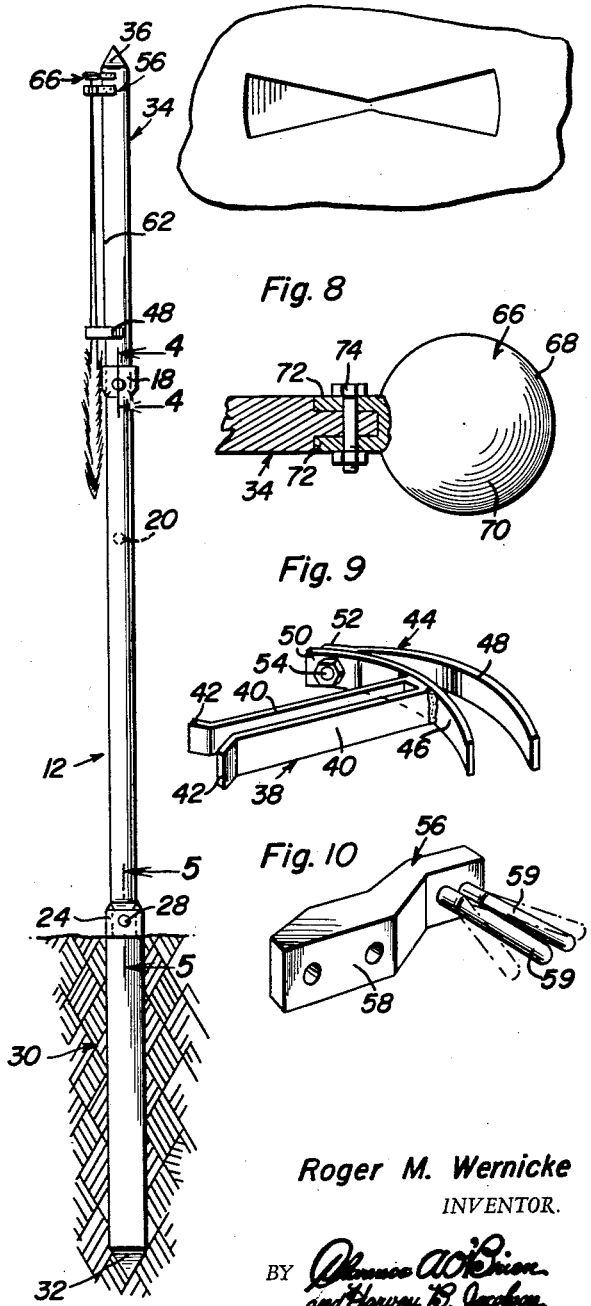
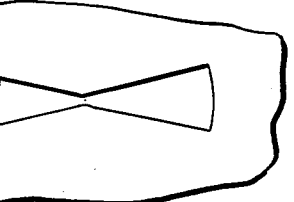
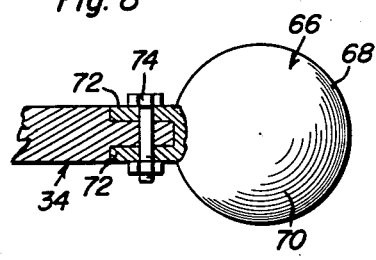
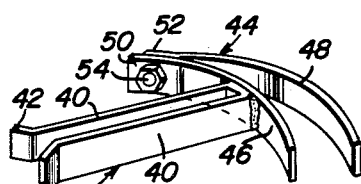
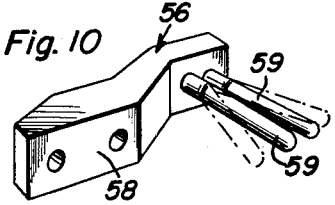
Roger M. Wernicke
INVENTOR.

Feb. 25, 1964 R. M. WERNICKE 3,122,110
HAND TRANSPLANTER FOR TREE SEEDLINGS
Filed May 12, 1961 2 Sheets-Sheet 2
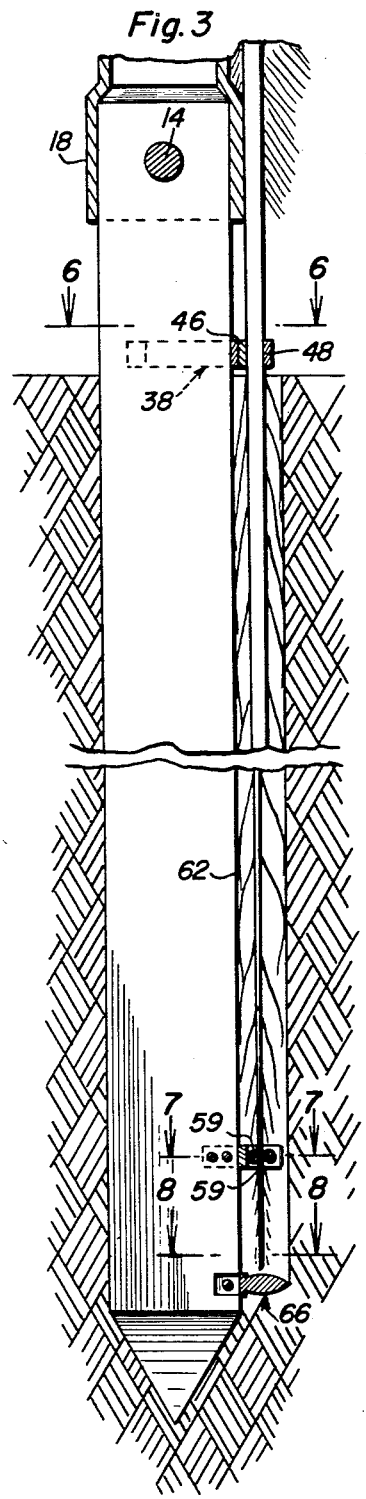
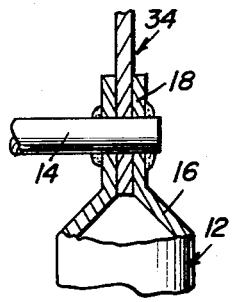
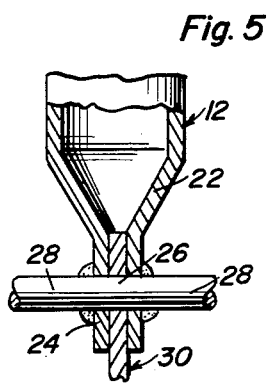
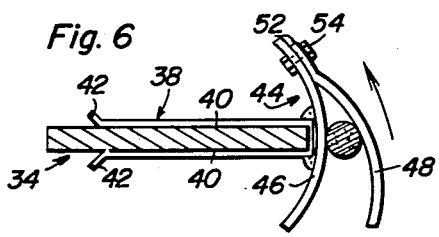
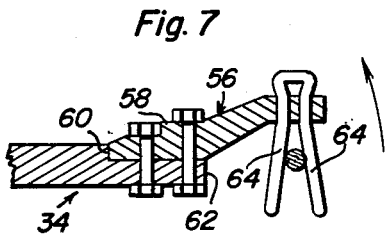
Roger M. Wernicke
INVENTOR.

United States Patent Office 3,122,110
Patented Feb. 25, 1964

3,122,110
HAND TRANSPLANTER FOR TREE SEEDLINGS
Roger M. Wernicke, 3563 Firestone Blvd., Pensacola, Fla.
Filed May 12, 1961, Ser. No. 109,537
11 Claims. (Cl. 111—4)

This invention relates to an improved hand transplanter which is expressly designed and properly constructed for expeditious and reliable planting of tree seedlings (or other plants) having long, slim and pliant tap roots such as, for example, slash pine.

Reforestation, as is generally well known, often requires planting by hand. This is commonly so because the selected site, due to steepness of grade or existing trees, stumps and forest debris and obstructions, may not be suitable or adaptable to adequate preparation or proper use of tractor-mounted planting machines. Then, too, hand planting is resorted to when replanting an imperfect stand, and also for planting an area which is relatively small. Hand planting is customarily done by teams of two men. To this end one man opens the desired planting hole, using a pick or a dibble. The other man inserts the seedling, holding it at a given level, and the first-named man fills in the hole.

An object of the present endeavor and the unique tool or implement, the above-named hand transplanter, is to provide a method and means through the medium of which one man can do the job aptly and satisfactorily; in fact, can accomplish the same results per unit of time as two men using the dibble method, and may do so with less painstaking effort. To appreciate the present solution of the problem it should be kept in mind that in the planting of slash pine (Pinus caribaea) it is absolutely essential that the tap root be planted in such a way that it is not kinked and so that the tip of the root is not turned upward. If the root tip is turned upward, the tree will fail to grow properly and will die prematurely. The seedling should be planted at least 2" deeper than it stood in the nursery. Slash pine seedlings from the nursery are extremely variable in size, varying from 6" to 8" long to about 24" in total length.

In carrying out this invention and with the above ideas in mind, an implement has been devised which is simple in construction, saves time and labor, is easy to use, enables a single operator to do as much work as two using a dibble, and does not require the operator to stoop or bend over in a back-breaking manner.

Briefly summarized the invention comprises ground penetrating hole-forming means, a handling shaft attached to and for utilizing said means, and complemental means for releasably attaching the tree seeding alongside of and to said shaft, whereby the operator, while still standing up may insert the seedling in the hole, release it and withdraw said complemental means, leaving the seedling in the ground with roots covered with soil.

More particularly the implement is characterized by handle-equipped applied ground penetrating means which is used to make the prerequisite planting hole at the selected site. Coaxial means is integrated with the first-named means for temporarily and releasably holding a tree seedling. This same means serves to guide and insert seedling into the hole, then releases and frees it from said means and leaves it in the ground with roots completely surrounded with soil. The first-named means comprises an elongated flat-faced linearly straight blade with a pointed leading end. The second-named means comprises a similar elongated flat-faced linearly straight blade, said blades having the same cross-sectional thickness and length and the second-named blade being of a width less than the width of the first-named blade.

The blade which is used to insert a seedling into the prepared hole is provided with complemental specially constructed devices to releasably hold the seedling and, in addition, this blade is provided upwardly of its leading end with a hole-opening member which has the additional function of a root tip protecting guard during the time the seedling is being inserted and lowered in the hole.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in elevation of the improved hand transplanter for tree seedlings showing the manner in which it is employed to drive and form a hole of the shape illustrated in plan in FIGURE 11;

FIGURE 2 is a view in side elevation, that is a view taken at right angles to FIGURE 1;

FIGURE 3 is an enlarged view in section and elevation showing the manner in which the seedling-carrying blade is inserted in the hole to carry out the depositing and subsequent implement removal step;

FIGURE 4 is a fragmentary view in section and elevation taken on the plane of the line 4—4 of FIGURE 2 looking in the direction of the arrows;

FIGURE 5 is a similar section taken on the plane of the line 5—5 of FIGURE 2;

FIGURES 6, 7 and 8 are enlarged sectional views taken on the lines 6—6, 7—7 and 8—8, respectively, of FIGURE 3;

FIGURE 9 is a view in perspective of the readily attachable and detachable as well as adjustable stem holding means or device;

FIGURE 10 is a view in perspective of the means or device for holding the tap root tip; and FIGURE 11 is a fragmentary plan view showing the shape of the prepared planting hole.

With reference now to the views of the drawings the numeral 12 designates a suitably elongated tube which is herein referred to as a shaft. In reference to FIGURE 1 the numeral 14 designates a right angularly projecting rod constituting a handgrip and also a footpiece the same being connected at one end to the upper end of the shaft in FIGURE 1. This may be accomplished by reducing the cross-section of the tube as at 16 and then attaching the cooperating end to the reduced terminal 18. A similar rod 20 on the diametrically opposite side is appropriately attached to a median portion of the tube and constitutes an additional handle or hand-grip. Still referring to FIGURE 1 the reduced lower end portion 22 is fashioned into an extension 24 to which the median portion 26 (FIG. 5) is attached, the extending end portion 28 providing handles and footpieces. The ground penetrating hole-forming blade 30 has an end attached to the terminal 24 and this blade is of predetermined thickness or cross-section, width and length and the leading end thereof is pointed and sharpened as at 32 to facilitate pressing the blade in the ground to form the planting hole. The seedling carrying, guiding and inserting blade is denoted by the numeral 34 and has one end portion secured to the reduced extension 18 as illustrated in FIG. 1 and here again this blade is flat-sided, of a length approximately equal to the length of the blade 30, has a pointed sharpened leading end 36 but is of a width slightly less than the width of the blade 30.

The stem placement and releasable holding means may be of some construction other than that herein precisely shown and described. The device presently in use is readily attachable to and removable from the blade 34 and comprises a U-shaped clip 38 (FIG. 9) having spaced parallel arms 40 with outwardly flared terminals 42. A stem gripping and releasing clasp 44 is attached to and carried by the clip 38. The clasp 44 comprises a rigid arcuate cleat 46 the median portion of which is welded to the bight portion of the clip 38. The numeral 48 designates a highly resilient spring finger which is opposed to the cleat with the two components 46 and 48 defining a substantially V-shaped clasp. The free ends are flared apart to facilitate the insertion of the stem within the clasp. The opposite ends 50 and 52 are rigidly bolted or otherwise bolted together as at 54. Both components 46 and 48 of the clasp are longitudinally bowed. The means or device for releasably positioning and retaining the tap root tip comprises a suitable bracket 56 having a body portion 58 seated in a notch 60 (FIG. 7) provided therefor in the blade, the bracket projecting beyond the adjacent longitudinal edge 62 and being provided with a pair of flexible highly resilient tines 64.

With reference now to FIGURE 8 it will be noted that the numeral 66 designates a hole opening member, more specifically, a disk having a marginal cutting edge 68 and top and bottom convex surfaces 70. On one side the disk is provided with spaced parallel lugs 72 which straddle the edge of the blade and are bolted thereto as at 74. As will be later noted this disk 66 opens the hole and protects the root tip as the seedling is lowered into the soil. It is to be mentioned here that for use in rocky soil the disk could be made more rugged or could be (within the purview of the concept) cone-shaped with the point at the bottom. Also a similar cone with the point up could be attached above the clamp to protect the clamp during withdrawal of the planting blade. In practice it might be necessary to cut a slot in the side of this cone for the tap root to pass through. As already mentioned the stem clip and holding clasp (FIG. 9) may in practice be replaced by some equivalent device. The aforementioned tines in FIG. 10 are denoted by the numeral 59 and preferably stainless spring steel wires capable of the desired holding and releasing function are used.

Thus equipped the implement, handled by one man, may be thrust into the soil upside-down at the desired planting location and as illustrated in FIG. 1, and with the planter blade upright. The seedling is held upside down by the operator and the tip of the tap root is slipped between the tines or held by some similar clip or means.

Ordinarily the hand transplanter is employed as follows:

Blade 30 is inserted into the soil as the planting site. In hard or compact soils it may be necessary to push the blade down to or beyond the planting depth and rotate the implement a few degrees, using handles 14 and 20, to open a hole for the seedling as shown in FIG. 11. In soft soils all that is necessary is to insert the blade 30 sufficiently to hold the implement in a stationary position.

The seedling is then held upside down and the tap root tip is inserted between the spring steel wires or tines 59 of clamp 56. The adjustable holder 44 which is held to the blade by a spring steel clip 38, is moved up or down the planting blade 34 to a point where the above-ground-portion of the plant can be engaged in it. The stem of the seedling is then slipped behind the spring steel finger 48, where it is held "lightly" in place.

The next step is to invert the implement (from FIG. 1 to FIG. 3), insert the planting blade 34 into the hole left by the other blade 30, thrust it down to the desired planting depth, using the footpiece on handle 14, and turn it 150° to 160° counterclockwise. This motion frees the seedling from the implement and at the same time pushes soil up against the root, firming it in place. The implement is then withdrawn and the holes left a short distance from the seedling may be closed by pressure from the operator's heel, if necessary.

It should be pointed out that when planting blade 34 is rotated in the soil, all the soil in a cylindrical space having a diameter equal to the width of the blade, is moved. The soil moving ahead of the rotating sides of the blade is compressed somewhat. When this moving compressed soil reaches the hole left by the disk 66 it has a tendency to expand into this hole and the closer the blade approaches this hole, the more firmly the soil is forced into it and up against the seedling root.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in driving a planting hole in the ground and inserting a tree seedling into said hole; a hand implement capable of stand-up use by a single operator thereof comprising a rigid elongated shaft having a hole-forming blade and a planting blade at its respective ends, each blade having its leading end pointed, the planting blade being narrower than the hole-forming blade and having means thereon for detachably mounting tree seedling parallel to one longitudinal edge thereof, said means embodying a longitudinally curved resilient stem engaging finger by way of which the stem of the seedling is releasably held until the planting blade is rotated in the hole by hand, at which time the stem disengages itself.

2. The structure according to claim 1, and wherein said means also includes a pair of freely responsive resilient tines which grippingly but releasably hold the tap root tip in place until the planting blade is rotated and coact with said finger to simultaneously release said tap root tip.

3. A planting device comprising an elongated blade having a pointed leading end, means on said blade for detachably mounting a tree seedling parallel to one longitudinal edge of said blade, said means including a first open end resilient gripping means positioned adjacent the upper following end of said blade, and a second open end resilient gripping means positioned adjacent the lower leading end of said blade, said gripping means adapted to releasably hold the tree seedling, and a hole-opening member positioned on said blade below and in line with the seedling mounting means, said hole-opening member extending outwardly beyond said mounting means for protecting the seedling during the insertion thereof.

4. The structure defined in claim 3 wherein the first gripping means is adjustably positioned on the blade.

5. For use in driving a planting hole in the ground and inserting a tree seedling into said hole; a hand implement capable of stand-up use by a single operator thereof comprising a rigid elongated shaft having similar elongate blades at its respective ends, each blade having its leading end pointed, one blade being narrower than the other blade and having means thereon for detachably mounting a tree seedling parallel to one longitudinal edge, said one blade being provided upwardly of its leading end and below said seedling mounting means with a hole-opening member having the additional function of a root tip protecting guard during the time the seedling is being inserted and lowered in said hole.

6. The structure defined in claim 5 wherein said member projects outwardly from said one longitudinal edge and has a transverse width greater than the thickness of said one blade.

7. The structure defined in claim 6 wherein said member projects outwardly a distance greater than said other blade.

8. The structure of claim 6 wherein said means for detachably mounting said tree seedling comprises open end resilient gripping means capable of releasing the seedling upon rotation of said one blade.

9. The structure defined in claim 6, and wherein said member comprises a disc having convex top and bottom surfaces and a marginal cutting edge.

10. The method of planting a seedling including the steps of forming a hole having an elongated relatively narrow cross-section, forming an elongated enlarged bore adjacent one edge of said hole along substantially the full length thereof and in communication therewith, inserting the root portion of a seedling into said elongated enlarged bore, and simultaneously and uniformly introducing earth into said bore along the full length thereof so as to cover said root portion.

11. The method of claim 10 including the step of rotating the earth adjacent one side of the hole past the bore along the full height thereof in a manner so as to induce a movement of the earth into the bore thus effecting the uniform introduction of earth.

References Cited in the file of this patent

UNITED STATES PATENTS

| | | | |
|---|---|---|---|
| 182,989 | Bernard | Oct. 10, | 1876 |
| 202,909 | Wilson | Apr. 23, | 1878 |
| 350,121 | Cranmer | Oct. 5, | 1886 |
| 501,392 | Wiedenmann | July 11, | 1893 |
| 1,026,331 | Tompkins | May 14, | 1912 |
| 1,398,852 | Golbert | Nov. 29, | 1921 |
| 1,607,569 | Schockley | Nov. 16, | 1926 |
| 2,227,800 | Tomilinson | Jan. 7, | 1941 |
| 2,826,206 | Slater | Mar. 11, | 1958 |